UNITED STATES PATENT OFFICE.

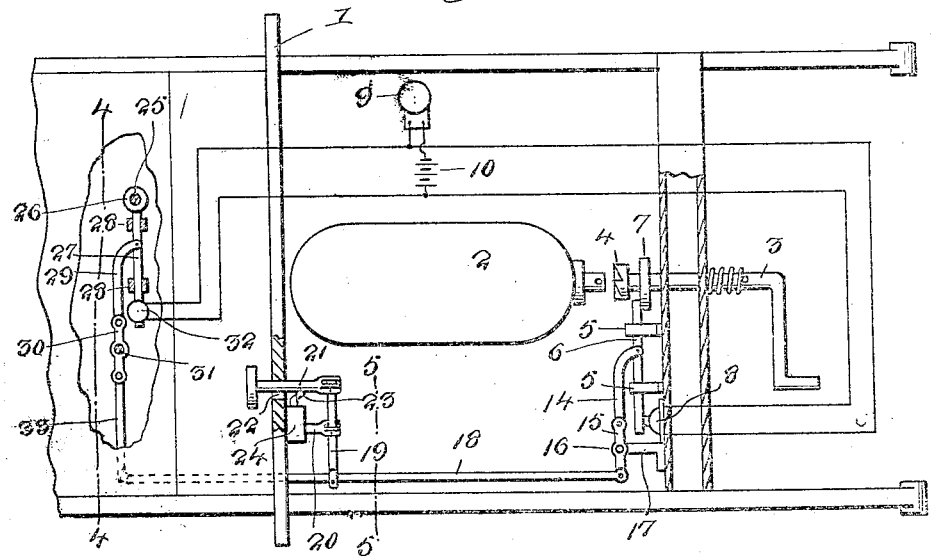

SIMEON G. McDANIEL, OF LAURENS, SOUTH CAROLINA.

LOCKING DEVICE AND ALARM FOR MOTOR-VEHICLES.

1,287,058.  Specification of Letters Patent.  Patented Dec. 10, 1918.

Application filed May 2, 1918. Serial No. 232,175.

*To all whom it may concern:*

Be it known that I, SIMEON G. MCDANIEL, a citizen of the United States, residing at Laurens, in the county of Laurens and State of South Carolina, have invented new and useful Improvements in Locking Devices and Alarms for Motor-Vehicles, of which the following is a specification.

This invention relates to new and useful improvements in locking devices for motor vehicles and the principal object of the invention is to provide means for preventing the cranking of the motor of the vehicle.

Another object of the invention is to provide an alarm with means for sounding the same when an attempt is made to crank the vehicle.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a diagrammatic plan view of the invention applied to an automobile.

Fig. 2 is an enlarged top view of the means for locking the hand crank.

Fig. 3 is a like view with these parts in different positions.

Fig. 4 is a section on line 4—4 of Fig. 1.

Fig. 5 is a section on line 5—5 of Fig. 1.

In these views 1 indicates the dash of an automobile and 2 the engine thereof. 3 represents the crank provided with the clutch 4 by which the engine or motor is cranked by hand. In carrying out my invention I locate a pair of brackets 5 on a part of the automobile adjacent the radiator and these brackets slidingly support a locking bar 6 which has its front end adapted to engage with a collar 7 located on the crank 3. The other end of said bar is adapted to engage with a push button 8 which is electrically connected with an alarm bell 9 and a battery 10, located at a convenient position in the car. As will be seen the outer wall 11 of the slot 12 in the inner bracket 5 through which the rod 6 passes is of curved formation, so that the bar may have a certain amount of rocking movement in said slot. The slot 13 in the outer bracket 5 is of much greater dimensions than the slot 12 to facilitate this rocking movement of the bar.

It will thus be seen that when the locking bar is moved toward the clutch it will come within the path of movement of the collar 7 so that when the crank 3 is moved inwardly to engage the clutch carried thereby with the clutch on the engine the said collar will engage the end of the said rod and thus prevent the clutches from coming into engagement. However, the bar 6 will be rocked sufficiently to cause its outer end to engage the push button and thus sound the alarm.

The means for moving said bar into and out of operative position consist of a lever 14 having one end curved and pivotally connected with the bar 6 intermediate its ends. The other end of said lever is connected with a link 15 pivoted midway its ends, as at 16, to a bracket 17, suitably carried by the automobile. The other end of the link is pivoted to a lever 18 which is in its turn pivoted to a bar 19 pivoted midway its ends to a bracket 20 carried by the dash of the automobile. The other end of the bar 19 is connected with an operating lever 21 passing through an opening 22 in the dash. This lever 21 is provided with a projection 23 which is engaged by the bolt of a lock 24 mounted on the dash and adapted to be operated by a suitable key to lock and unlock the parts.

It will thus be seen that by moving the operating lever 21 the locking bar 6 may be moved into and away from the path of movement of the collar 7. It will be seen that when the locking bar 6 is in locking position it will prevent cranking of the machine, but the parts will be in such a position that when an attempt is made to crank the machine the alarm will be sounded.

I also use a modification of the above described means for preventing the use of the self-starter, commonly used on motor vehicles. As shown I combine the two though it will be understood that I may use one or the other separately.

25 indicates the foot lever of the self-starter which is provided with a collar 26. 27 indicates the locking bar supported by the brackets 28 secured to the floor of the machine and the means for moving said bar into and out of the path of the collar 26 consists of a curved lever 29 having one end pivoted to said bar and its other end to a link 30 which is pivotally supported midway its ends by a bolt 31 carried by the floor of the machine. 32 indicates the push button secured to the floor and connected with the alarm and battery as before. The other end of the link 30 is connected with an extension 33 of the lever 18, said extension having a right angular part as shown.

It will thus be seen that the operation of the operating lever 21 will cause the connecting parts to move the locking bar 27 into and out of the path of the collar 26. When said locking bar is engaged by the collar its other end will be forced upwardly against the push button as before described.

It is thought from the foregoing description that the advantages and novel features of my invention will be readily apparent.

I desire it to be understood that I may make such changes in the construction and in the combination and arrangement of the several parts, provided that such changes fall within the scope of the appended claims.

What I claim is:—

1. In combination with the cranking means of an automobile, of a locking bar for preventing the engagement of said means, means for operating said locking bar, a lock for such means and a push button alarm operated by said bar when the same is in locking position and an attempt is made to crank the machine.

2. In combination with the cranking means of an automobile, of a locking bar for limiting the movement of such means, levers for moving said locking bar into and out of operative position, a lock for said levers and alarm means engaged by said locking bar when the same is in locking position and an attempt is made to crank the machine.

3. In combination with the cranking means of an automobile, of a collar on the movable part of such means, a locking bar, levers for moving the same into and out of the path of said collar, a lock for such levers, brackets for supporting the locking bar while permitting rocking movement thereof when engaged by the collar and an alarm engaged by said locking bar when rocked by the collar.

4. In combination with the cranking means of an automobile, of a collar on the movable part thereof, a locking bar, brackets for supporting the same while permitting rocking movement, levers connected with said bar, an operating lever connected with the levers for moving the locking bar into and out of the path of the collar, a projection on said operating lever, a lock adapted to engage with said projection to lock the parts in position and a push button alarm operated by said bar when the same is in locking position and an attempt is made to crank the machine.

In testimony whereof I affix my signature.

SIMEON G. McDANIEL.